(12) United States Patent
Nazari et al.

(10) Patent No.: US 10,140,174 B2
(45) Date of Patent: Nov. 27, 2018

(54) SEPARATING STORAGE TRANSACTION LOGS

(71) Applicant: Hewlett Packard Enterprise Development LP, Houston, TX (US)

(72) Inventors: Siamak Nazari, Fremont, CA (US); Jin Wang, Fremont, CA (US); Srinivasa D Murthy, Fremont, CA (US); Ming Ma, Fremont, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 131 days.

(21) Appl. No.: 14/914,713

(22) PCT Filed: Aug. 29, 2013

(86) PCT No.: PCT/US2013/057185
§ 371 (c)(1),
(2) Date: Feb. 26, 2016

(87) PCT Pub. No.: WO2015/030758
PCT Pub. Date: Mar. 5, 2015

(65) Prior Publication Data
US 2016/0203043 A1    Jul. 14, 2016

(51) Int. Cl.
*G06F 11/00* (2006.01)
*G06F 11/10* (2006.01)
(Continued)

(52) U.S. Cl.
CPC ...... *G06F 11/1004* (2013.01); *G06F 11/1471* (2013.01); *G06F 11/2089* (2013.01);
(Continued)

(58) Field of Classification Search
CPC ............ G06F 11/1004; G06F 11/2097; G06F 11/1471; G06F 11/2089; G06F 11/3006; G06F 11/3476; G06F 17/30368
See application file for complete search history.

(56) References Cited

U.S. PATENT DOCUMENTS 5,287,501 A * 2/1994 Lomet ................. G06F 11/1474
                                                    707/648
6,055,604 A    4/2000 Voigt et al.
(Continued)

FOREIGN PATENT DOCUMENTS

| CN | 1454349 | 11/2003 |
|---|---|---|
| CN | 101853186 | 10/2010 |
| CN | 103270500 | 8/2013 |

OTHER PUBLICATIONS

ISR/WO, PCT/US2013/057185, HP reference 83276216, May 27, 2014, 9 pps.

(Continued)

*Primary Examiner* — Bryce P Bonzo
*Assistant Examiner* — Katherine Lin
(74) *Attorney, Agent, or Firm* — Hewlett Packard Enterprise Patent Department

(57) ABSTRACT

Disclosed herein are a system, non-transitory computer-readable medium, and method for maintaining storage unit transaction logs. Storage unit transaction logs received from controllers are separated.

12 Claims, 4 Drawing Sheets

(51) Int. Cl.
  *G06F 11/30*  (2006.01)
  *G06F 11/34*  (2006.01)
  *G06F 17/30*  (2006.01)
  *G06F 11/14*  (2006.01)
  *G06F 11/20*  (2006.01)

(52) U.S. Cl.
  CPC ...... *G06F 11/3006* (2013.01); *G06F 11/3476* (2013.01); *G06F 17/30368* (2013.01); *G06F 11/2097* (2013.01)

(56) References Cited

U.S. PATENT DOCUMENTS

| | | |
|---|---|---|
| 7,900,085 B2 | 3/2011 | Little |
| 8,224,877 B2 | 7/2012 | Barrall et al. |
| 8,266,101 B1 | 9/2012 | Shuai |
| 2002/0188733 A1 | 12/2002 | Collins et al. |
| 2006/0206544 A1 | 9/2006 | Oks et al. |
| 2008/0189498 A1* | 8/2008 | Brown ............... G06F 11/1004 711/162 |
| 2009/0100113 A1 | 4/2009 | Burghard et al. |
| 2009/0172211 A1 | 7/2009 | Perry et al. |
| 2010/0169284 A1 | 7/2010 | Walter et al. |
| 2012/0144152 A1 | 6/2012 | Jeddeloh |
| 2012/0311376 A1 | 12/2012 | Taranov et al. |

OTHER PUBLICATIONS

Michael Lee, "A Guide to Exchange Disaster Recovery Planning," (Web Page), 2006, pp. 1-11, Microsoft Corporation and CMP Media, LLC, Available at: <technet.microsoft.com/enus/magazine/2006.08.exchangerecovery.aspx>.

* cited by examiner

SEPARATING STORAGE TRANSACTION LOGS

BACKGROUND

Some distributed file systems heretofore use a network of controllers to manage transactions to and from a storage unit. Such controllers may replicate transaction logs amongst themselves. In the event a controller fails, the transaction logs may be used to determine the transactions that were in progress when the controller failed.

DETAILED DESCRIPTION

As noted above, controllers in a network may replicate transaction logs amongst themselves for fault tolerance purposes. If one controller fails, another controller may substitute for the failed controller. By analyzing the transaction logs, the substituting controller may continue from where the failed controller ended. Some controllers ignore the received transaction logs until the sending controller fails. Such controllers may be known as "passive recipients." This approach has the advantage of being undisruptive to the system. In this instance, the recipient does not authenticate the received transaction logs upon receipt and simply ignores them; furthermore, the sending controller does not wait for confirmation from the recipient.

However, while passive recipient controllers are undisruptive, problems may occur if the replicated transaction logs are corrupt and the sending controller fails. In this instance, the substituting controller may not be able to determine which storage unit the transaction logs are associated with and the entire system may be automatically stopped. Support engineers may need to stabilize the system by inspecting the logs in each controller's memory and undoing some transactions. Piecing together the transaction logs may be a burdensome, tedious process. The transaction logs may be scattered across different memory addresses; therefore, not only is it difficult to determine which storage unit generated each transaction log, but the disorderly or otherwise random arrangement of the logs makes it difficult to determine the correct chronological sequence of the logs.

In view of the foregoing, examples disclosed herein address these issues by providing a system, computer-readable medium, and method for maintaining transaction logs. In one example, storage unit transaction logs received from controllers are separated into different lists or sequences such that each list or sequence contains transaction logs generated by one storage unit. Thus, rather than being randomly arranged in memory, the logs may be segregated by storage unit. If transaction logs from a failed controller are unreadable, the failed controller may be substituted by another without halting the entire system, since the sender of the logs can be automatically determined despite corruption of the logs. In yet a further example, checksums may be used to authenticate the content and the order of the logs. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
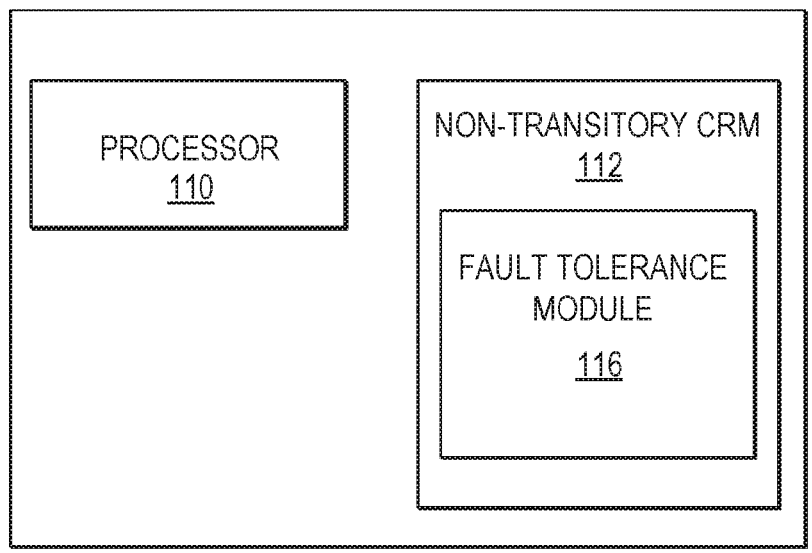
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may be one controller in a network of similarly configured computers. The network of controllers may manage transactions to and from a plurality of storage units. Computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other computers in the network. The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include a fault tolerance module 116. Non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As noted above, a file system may comprise a network of controllers that manage transactions to and from at least one storage unit and that maintain transaction logs containing details of the transactions. Each controller in the network may be configured similarly to computer apparatus 100 of FIG. 1. In one example, a given controller in the network may execute fault tolerance module 116. Upon execution, fault tolerance module 116 may instruct processor 110 to segregate transaction logs received from the network into separate lists allocated in a memory such that each list contains transaction logs generated by one storage unit. In a further example, fault tolerance module 116 may instruct processor 110 to derive a content checksum for content in each received transaction log and derive a pointer or link checksum for each address associating a pair of received transaction logs in each list.

Figure 2:
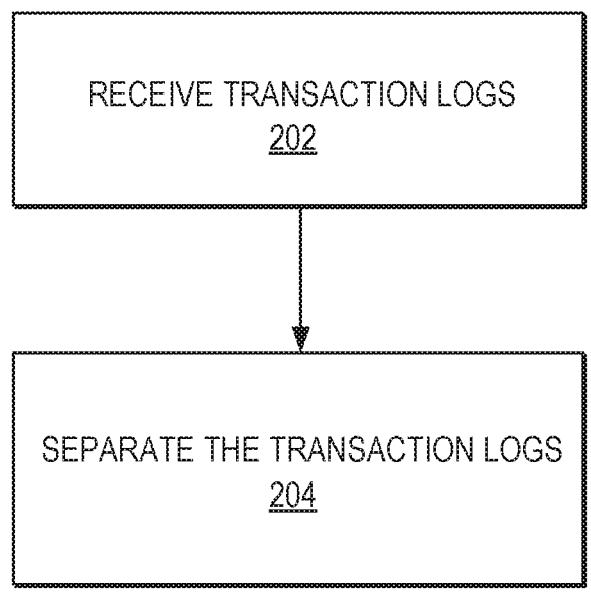
FIG. 2 is a flow diagram of an example method in accordance with aspects of the present disclosure.
Figure 3:
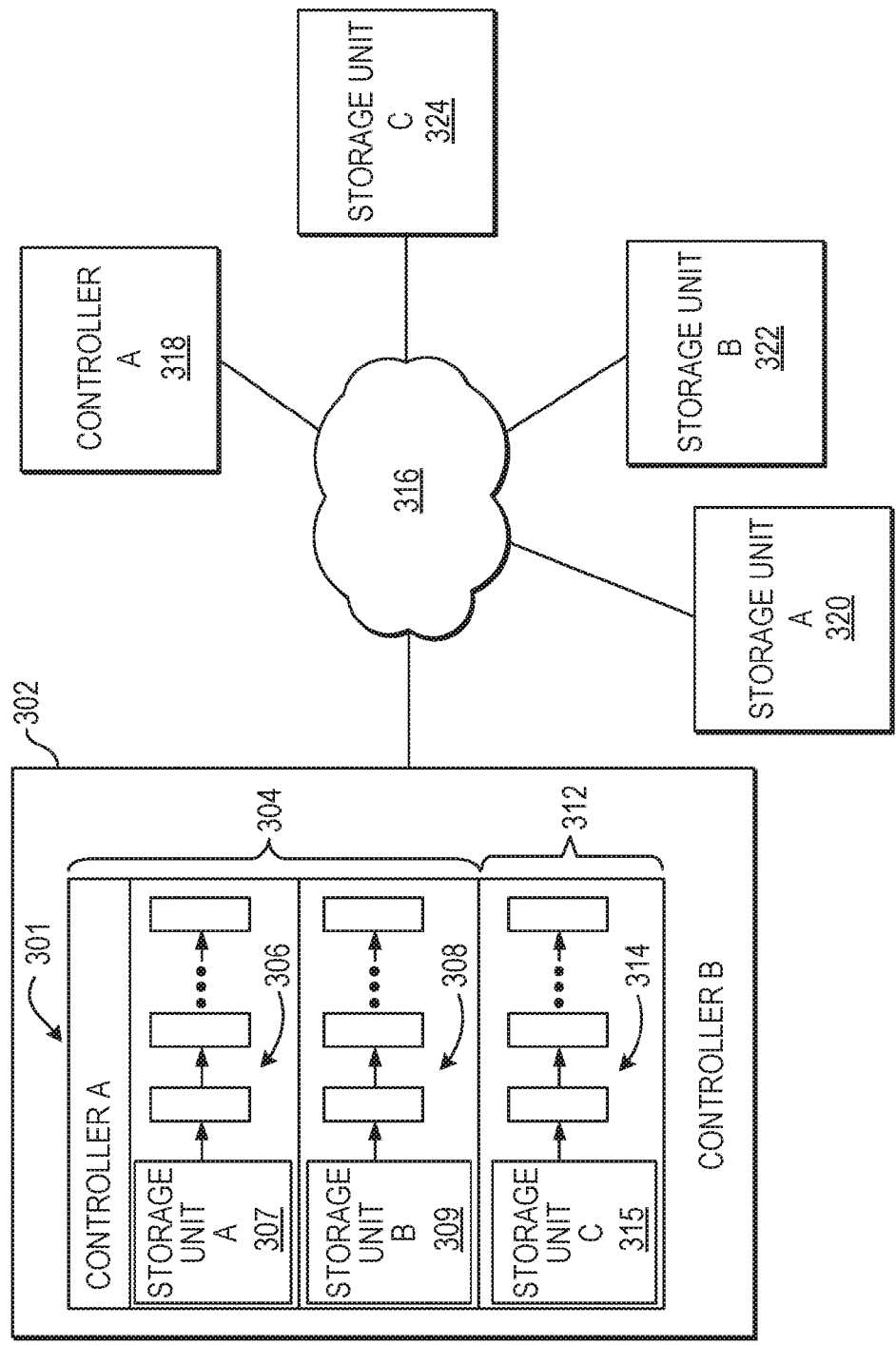
FIG. 3 is a working example in accordance with aspects of the present disclosure.
Figure 4:
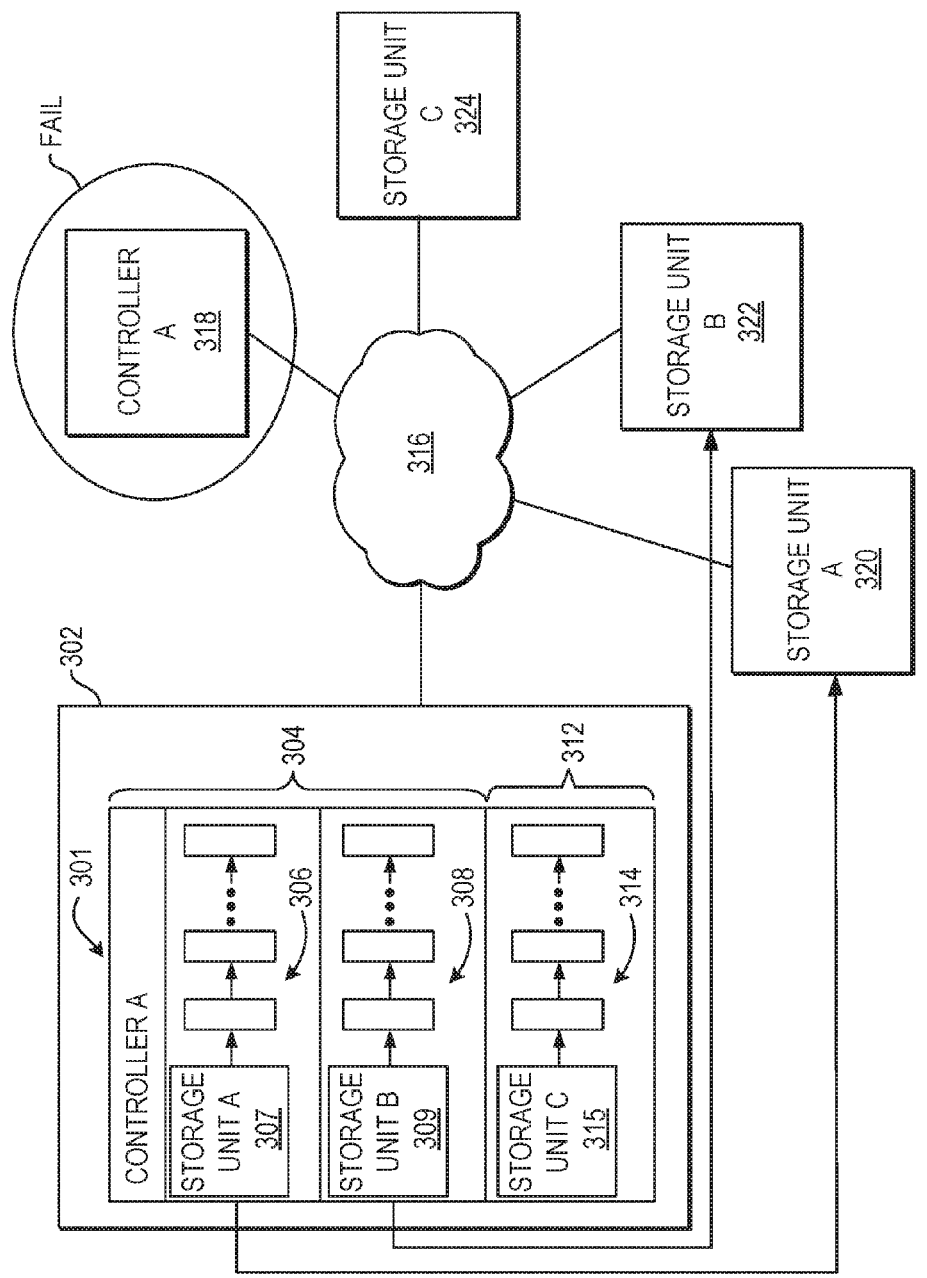
FIG. 4 is a further working example in accordance with aspects of the present disclosure.

Working examples of the system, method, and non-transitory computer-readable medium are shown in FIGS. 2-4. In particular, FIG. 2 illustrates a flow diagram of an example method 200 for maintaining transaction logs. FIGS. 3-4 each show a working example in accordance with the techniques disclosed herein. The actions shown in FIGS. 3-4 will be discussed below with regard to the flow diagram of FIG. 2.

As shown in block 202 of FIG. 2, transaction logs may be received from a network or cluster of controllers. Referring now to FIG. 3, an example cluster comprising two illustrative controllers 302 and 318 are shown communicating over network 316. Network 316 may comprise various configurations and use various protocols including intranets, virtual private networks, local Ethernet networks, private networks using communication protocols proprietary to one or more companies, cellular and wireless networks (e.g., WiFi), and various combinations of the foregoing. Although only two controllers are depicted in FIG. 3, it should be appreciated that a typical system may include a larger number of networked controllers.

FIG. 3 also shows three storage units 320, 322 and 324 in communication with controllers 302 and 318 via network 316. In the example of FIG. 3, controller 318 (i.e., Controller A) may manage transactions to and from storage units 320 and 322 (i.e., Storage Unit A and Storage unit B respectively). Furthermore, in the example of FIG. 3, storage unit 324 (i.e., Storage Unit C) may be managed by controller 302 (i.e., Controller B). Each storage unit 320, 322, and 324 may comprise a physical block device that provides a collection of linearly addressed data blocks that can be read from or written to. Some examples of storage units may include, but are not limited to, a disk drive, a fixed or removable magnetic media drive (e.g., hard drives, floppy or zip-based drives), writable or read-only optical media drives (e.g., CD or DVD), tape drives, or a solid-state mass storage devices. In another example, the storage units may be a storage device residing on a storage network, such as a Small Computer System Interface ("SCSI") device presented to a Storage Area Network ("SAN") using a Fibre Channel, Infiniband, or Internet Protocol ("IP") interface. It is understood that each storage unit 320, 322, and 324 may include any other type of storage unit and that the foregoing is a non-exhaustive list. In another example, storage units 320, 322, and 324 may be configured as a volume that may be accessed via an operating system's logical interface.

FIG. 3 also shows a close up illustration of one of the controllers, controller 302, which is shown having a memory 301 arranged therein. While memory 301 is shown as memory local to controller 302, it is understood that some examples may be implemented using remote memory. In this example, memory block 304 is mapped to controller 318. Memory block 304 may be used to maintain transaction logs for each of the storage units managed by controller 318, which in this example are storage units 320 and 322. Controller 302 may also allocate a memory block 312 to maintain transaction logs for its own storage unit, which in this example is storage unit 324. While the example of FIG. 3 shows one block of memory mapped to each controller, it is understood that other examples may map a plurality of memory blocks to each controller.

Referring back to FIG. 2, the transaction logs may be separated, as shown in block 204. In one example, the transaction logs may be distributed among separate lists or series of transaction logs. Each list may be, for example, a linked list data structure such that each transaction log may further comprise an address pointer to the next transaction log.

Referring back to the example of FIG. 3, memory block 304 contains two different sequences of transaction logs, namely list 306 and list 308. In this example, list 306 and list 308 employ a linked list data structure to keep track of transaction logs arising from each storage unit. Each list may comprise a list head record that indicates which storage unit the transaction logs in each list originate from. For example, list 306 comprises list head record 307 and list 308 comprises list head record 309. List head record 307 indicates that the transaction logs in list 306 arise from storage unit 320 (i.e., Storage Unit A) and list head record 309 indicates that the transaction logs in list 308 arise from storage unit 322 (i.e., Storage Unit B). In the event controller 318 fails, the list head record may be read to determine the storage unit managed by controller 318. FIG. 3 also shows a list 314 with a list head record 315. List head record 315 indicates that the transactions in list 314 originate from storage unit 324 (i.e., Storage Unit C). Controller 302 may maintain list 314 to track the transactions logs from its own storage unit 324.

Controller 302 may replicate copies of list 314 to controller 318 such that, in the event controller 302 fails, controller 318 may substitute for controller 302 using a copy of list 314. Controller 318 may also keep local copies of list 306 and list 314 in its own memory. While FIG. 3 shows controller 302 managing storage unit 324 and controller 318 managing two storage units 320 and 322, it is understood that the configuration in FIG. 3 is merely illustrative and that the controllers may be associated with the storage units in any combination. As noted above, it is understood that additional storage units and controllers may be configured.

Upon receipt of each transaction log by a controller (e.g., controller 302), a content check sum may be derived for each received transaction log and a pointer checksum may be derived for each pointer or link associating a pair of received transaction logs in each list. As will be discussed further below, these checksums may be used to authenticate the content of each transaction log and an order of the transaction logs in each list or series of transaction logs. In one example, the order of the logs may be defined as the chronological order in which the transaction logs were generated.

Referring now to FIG. 4, controller 302 may determine whether a controller in the network has failed. In the example of FIG. 4, controller 318 fails and controller 302 may locate each list of transaction logs arising from one of the storage units managed by controller 318. Controller 302 is shown executing subsequent transactions in place of controller 318 using each list of transaction logs arising from one of the storage units managed by controller 318. As noted above, the content checksum derived upon receipt of each transaction log may be used to authenticate the content contained in each transaction log arising from one of the storage units managed by the controller that failed. Furthermore, the pointer checksum may be used to authenticate an order of the transaction logs in each list arising from one of the storage units managed by the controller that failed. Controller 302 may substitute for controller 318 automatically and may undo any changes that are not resolvable due to corruption of the logs.

Advantageously, the foregoing system, method, and non-transitory computer readable medium may distribute or otherwise segregate the transaction logs into separate lists such that each list comprises transaction logs from one storage unit. In this regard, the system may recover from a failed controller automatically by checking a list head record indicative of the storage unit from which the logs in each list originate. In turn, the techniques disclosed herein may prevent a system from coming to a halt when authentication of a transaction log fails. Instead, the failed remote controller is replaced in a way that is seamless and undisruptive to the system.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
at least one processor; and
a memory to store instructions that, when executed by the at least one processor, cause the at least one processor to:
receive transaction logs of a plurality of transaction logs from a given controller of a plurality of controllers, wherein the received transaction logs are associated with multiple storage units of a plurality of storage units managed by the controllers;
segregate the received transaction logs into separate lists allocated in a memory such that each list contains transaction logs generated by one storage unit of the multiple storage units, wherein, in each of the lists, pairs of transaction logs are associated by respective addresses;
derive a content checksum for content in each received transaction log;
derive a pointer checksum for each address associating a pair of received transaction logs in the lists;
determine whether the given controller has failed; and
locate the separate lists allocated in the memory in response to determining that the given controller has failed.

2. The system of claim 1, wherein, the instructions, when executed by the at least one processor, cause the at least one processor to, upon determining that the given controller has failed, execute subsequent transactions in place of the given controller using each list of the separate lists.

3. The system of claim 1, wherein the instructions, when executed by the at least one processor, cause the at least one processor to, upon determining that the given controller has failed:
use the content checksum to authenticate content contained in each received transaction log; and
use the pointer checksum to authenticate an order of transactions logs in each list.

4. The system of claim 1, wherein each list of transaction logs comprises a list head record that indicates which storage unit the transaction logs in each list originate from.

5. A non-transitory computer readable medium having instructions therein which upon execution instruct at least one processor to:
establish communication with each controller in a cluster of controllers that manage transactions to and from a plurality of storage units and that maintain transaction log files containing details of the transactions;
read transaction logs received from the cluster, including reading a set of transaction logs received from a given controller of the cluster of controllers, wherein the transaction logs of the set of transaction logs are associated with multiple storage units of the plurality of storage units;
separate the transaction logs of the set of transaction logs into different series of transaction logs such that each series contains transaction logs generated by one storage unit of the multiple storage units;
determine whether the given controller has failed; and
locate the series of transaction logs in response to determining that the given controller has failed.

6. The non-transitory computer readable medium of claim 5, wherein, the instructions therein upon execution further instruct at least one processor to execute subsequent transactions in place of the given controller using each series of transaction logs.

7. The non-transitory computer readable medium of claim 5, wherein pairs of transactions of each series are associated by links, and wherein the instructions therein upon execution further instruct at least one processor to:
calculate a content checksum for content in each transaction log of the set of transaction logs;
calculate a link checksum for each link associating a pair of received transaction logs in each series of transaction logs;
use the content checksum to authenticate content contained in each transaction log of the received transaction logs in response to determining that the given controller has failed; and
use the link checksum to authenticate an order of transaction logs in each series arising from one of the storage units of the multiple storage units, in response to determining that the given controller has failed.

8. The non-transitory computer readable medium of claim 5, wherein each series of transaction logs comprises a list head record that indicates which storage unit the transaction logs in each list originate from.

9. A method comprising:
reading, using at least one processor, transaction logs of storage unit transactions managed by a cluster of controllers, wherein the transaction logs comprise a set of transaction logs received from a given controller of the cluster of controllers, and wherein the transaction logs of the set of transaction logs are associated with a plurality of storage units;
distributing, using at least one processor, the transaction logs of the set of transaction logs into separate sequences of transaction logs such that each sequence contains transaction logs generated by one storage unit of the multiple storage units;
determining, using at least one processor, a content checksum for content in each transaction log received by the cluster of controllers;

determining, using at least one processor, a pointer checksum for each address pointer associating a pair of received transaction logs in each sequence of transaction logs;

determining, using at least one processor, whether the given controller has failed; and locating, using at least one processor, each sequence of transaction logs in response to determining that the given controller has failed.

10. The method of claim 9, further comprising executing, using at least one processor, subsequent transactions in place of the given controller by reading each sequence of transaction logs in response to determining that the given storage controller has failed.

11. The method of claim 9, further comprising:

authenticating, using at least one processor, content contained in each transaction log of the set of transaction logs with the content checksum in response to determining that the given controller has failed; and authenticating, using at least one processor, an order of the transaction logs of the set of transaction logs in each sequence with the pointer checksum in response to determining that the given controller has failed.

12. The method of claim 9, wherein each sequence of transaction logs comprises a list head record that indicates which storage unit the transaction logs in each sequence originate from.

\* \* \* \* \*